United States Patent [19]

Heindl

[11] Patent Number: 5,426,078

[45] Date of Patent: Jun. 20, 1995

[54] USE OF A FINELY DIVIDED, REFRACTORY, OXIDIC MICROPOWDER FOR PREPARING CERAMIC MASSES AND MOLDINGS

[75] Inventor: Roland Heindl, Leoben, Austria

[73] Assignee: Veitscher Magnesitwerke-Actien-Gesellschaft, Vienna, Austria

[21] Appl. No.: 72,983

[22] Filed: Jun. 4, 1993

[30] Foreign Application Priority Data

Jun. 5, 1992 [DE] Germany .................. 42 18 565.3
Nov. 5, 1992 [DE] Germany .................. 42 37 317.4

[51] Int. Cl.⁶ ................ C04B 35/01; C04B 35/04; C04B 35/44; C04B 35/443

[52] U.S. Cl. ................. 501/94; 501/109; 501/120; 501/127

[58] Field of Search ............ 501/120, 109, 127, 94

[56] References Cited

U.S. PATENT DOCUMENTS 1,992,482  2/1935  Heuer .
2,030,200  2/1936  Gallup ................ 501/127
3,432,313  3/1969  Gitzen et al. .......... 501/153
4,119,473 10/1978  Lundgren et al. ....... 501/109 X
4,126,479 11/1978  Videtto ............... 501/120
4,252,544  2/1981  Takahashi ............. 501/127 X
4,324,862  4/1982  Gebler ................ 501/109
4,544,643 10/1985  Fraser ................ 501/127
5,252,526 10/1993  Whittemore ............ 501/127
5,283,215  2/1994  Hosokawa et al. ....... 501/120

FOREIGN PATENT DOCUMENTS 2335469  7/1977  France ............... 501/109
0034568 11/1975  Japan ................ 501/120

Primary Examiner—Mark L. Bell
Assistant Examiner—David Sample
Attorney, Agent, or Firm—John F. A. Earley; John F. A. Earley, III

[57]     ABSTRACT

The present invention pertains to the use of a finely divided magnesium oxide micropowder for preparing ceramic masses and moldings.

16 Claims, No Drawings

USE OF A FINELY DIVIDED, REFRACTORY, OXIDIC MICROPOWDER FOR PREPARING CERAMIC MASSES AND MOLDINGS

SPECIFICATION

The present invention pertains to the use of a finely divided magnesium oxide micropowder for preparing ceramic masses and moldings.

A magnesium oxide in the form of a fine powder and its use for preparing high-density ceramics have been known from [Austrian Patent] AT 392 464 B. The finely divided magnesium oxide has a particle size of $<15$ $\mu$m and a specific surface of $<20$ m$^2$/g (determined according to the BET method from the nitrogen adsorption isotherm). It is further characterized by a primary particle shape factor between 1 and 1.5 as well as by a coating consisting of a hydrophobizing substance. The said particle shape factor describes essentially spherical particles, whose degree of dispersity is increased by the said addition of a hydrophobizing substance.

Even though (undesired) agglomerates are prevented from forming by the hydrophobization, recrystallization with grain growth and consequently growth of the finely divided MgO particles, which leads to an irregular structural constitution, will ultimately occur during firing. A finely divided magnesium oxide powder, which is obtained from an aqueous suspension by spray drying, has also been known from practice; a coating agent, which is to precipitate possibly as a monomolecular layer on the surface of the oxide particles, is added to the suspension. The coating agent consists of, e.g., a carboxylic acid. However, due to processing in an aqueous suspension, hydration of the magnesium oxide into magnesium hydroxide cannot be prevented, even though the degree of hydration can be limited to values less than 10 wt. % by the use of the coating agent and the subsequent spray drying. However, hydration leads to a change (increase) in the shape of the particles, which is undesirable. It can be stated as a rule of thumb that a degree of hydration of 1.0 wt. % leads to a linear increase by 1.0% in the size of the corresponding particle.

In addition, the prior-art finely divided magnesium oxide powders can be processed only together with binders in a coarse ceramic matrix.

The basic task of the present invention is to provide a possibility for preparing refractory, ceramic masses and moldings which lead to sufficient green bond and high density after firing even without expensive processing of the starting components.

The present invention is based on the finding that this can be achieved by using a finely divided, refractory, oxidic micropowder in a coarse ceramic, refractory matrix, wherein the micropowder occurs very extensively in the form of single-fraction particles.

It was found that purely physical binding can be achieved between the particles by using such single-fraction particles, and this binding leads to a basic strength that is sufficient even in the green state and is sometimes higher than that according to the state of the art. In addition, recrystallization with grain growth, during which smaller particles coagulate with larger particles during sintering, as a result of which irregular sintering characteristics will develop, is advantageously prevented from occurring by the use of single-fraction particles.

In contrast, the use of the finely divided oxidic micropowder with very extensively uniform particle diameter leads to physical adhesion of the particles to one another already in the green state, and this adhesion continues in a uniform sintering during firing. The finely divided component advantageously fills the wedges between the coarser particles in the form of a very dense spherical packing, thus making it possible to achieve a markedly reduced porosity in the finished (fired) product.

It can be calculated statistically that a residual porosity of 8 to 10 vol. % is obtained in the finished (fired) product in the case of, e.g., an initial porosity of 20 vol. % in the coarse-grain matrix material (with a maximum particle size of 3 mm and a minimum particle size above the fine grain fraction) as well as by addition of 15 wt. % of the finely divided single-fraction oxide powder with a particle size slightly less than 1.0 $\mu$m.

Under these premises, the present invention pertains, in its most general embodiment, to the use of a finely divided, refractory, oxidic micropowder of very extensively uniform particle size, which is obtained after dispersion in a non-aqueous dispersing agent, in a coarse ceramic, refractory matrix material for preparing ceramic masses and moldings of high green bond and high density after firing.

The micropowder should be used in a particle size less than 10 $\mu$m, and particle sizes less than 1 $\mu$m have a particularly favorable effect according to the present invention.

The terms "single-fraction particles" and "very extensively uniform particle size" are not meant to imply that exactly single-fraction particles are used, because these would be able to be prepared only at increased expense if at all, even though they would be particularly preferred; thus, according to an embodiment variant, the use of a finely divided micropowder is proposed, in which 90 wt. % of the particles have a maximum deviation of $\pm 10\%$ from the mean particle diameter.

The amount of micropowder used may vary in an application-specific manner, but it should be fundamentally between 5 wt. % and 18 wt. % in relation to the total mass, and a percentage between 10 wt. % and 15 wt. % might be considered for most fields of application.

Conventional screen characteristics, which are in the particle size range of $<5$ mm and $>$ than the micropowder, can be used for the coarse ceramic matrix material.

As was initially explained, the essential advantage of the described use is that the combination of coarse ceramic matrix material and dispersed, finely divided micropowder leads to the possibility of operating without binder, because the finely divided single-fraction component acts quasi as an "in situ binder."

To optimize the dispersing action of the finely divided component, the corresponding weight percentage is first prepared in a non-aqueous dispersing medium (as a result of which hydration is prevented in the case of hydration-sensitive oxides such as MgO), wherein the dispersing medium, which is inert with respect to the solids, may consist of, e.g., naphthene-basic oils or fatty alcohols, and, e.g., a modified alkyd resin (polyester) may be used as the dispersing agent.

The refractory, oxidic micropowder may consist of various oxides, e.g., MgO, Al$_2$O$_3$, Cr$_2$O$_3$, and/or TiO$_2$. The oxidic micropowder may also consist of only one of these oxides; however, it is also possible to use mixtures of these oxides as the micropowder, especially when spinel formation is desirable. It is advantageous to use, e.g., an MgO/Cr$_2$O$_3$ dispersion in this case.

The use according to the present invention achieves its most advantageous properties when a dispersion with a very high solids content of the oxidic micropowder is used. These are understood to be dispersions which have a solids content exceeding 85 wt. % in relation to the total dispersion. The percentage of the dispersing agent correspondingly amounts to up to 15 wt. %.

It was surprisingly observed that such highly concentrated dispersions can be prepared in high-energy mixers by using a suitable dispersing agent (e.g., polyester), in which case the solids content can be set even at values exceeding 90 wt. %.

The coarse ceramic matrix material is selected as a function of the desired properties of the material.

Thus, it is possible, for purely magnesitic products, to prepare a magnesitic, coarse ceramic matrix material with an MgO micropowder. However, the micropowder may also consist of a spinel-forming MgO/Cr$_2$O$_3$ or MgO/Al$_2$O$_3$ dispersion in this case.

When a coarse ceramic matrix material based on Al$_2$O$_3$ is used (e.g., alumina, tabular alumina, corundum) is used, it is advantageous to use an Al$_2$O$_3$ micropowder, but it may again be replaced completely or partially by TiO$_2$ or another refractory, oxidic micropowder.

Even when oxides that are not sensitive to hydration, e.g., Al$_2$O$_3$, are used, this should preferably be prepared in a non-aqueous dispersing medium in order to maintain the water content in the mass prepared as low as possible. The preparation method with a non-aqueous dispersing medium offers the advantage that the above-mentioned, unusually high solids concentrations in the dispersion can be reached more easily, as a consequence of which not only the green bond of the ceramic mass (after mixing with the coarse ceramic matrix material), but also the density after firing can thus be substantially improved.

Thus, densities of 3.25 g/cm$^3$ can be reached after firing by using an MgO micropowder in purely magnesitic bricks.

However, it is also possible to separate the refractory, oxidic micropowder dispersion from the dispersing medium used for preparation by, e.g., spray drying or freeze drying of the dispersion, prior to mixing with the coarse ceramic matrix material. The dispersing material is thus removed, e.g., by suction filtration, so that a very fine, pure and surface-modified micropowder is prepared. This micropowder can then also be used in aqueous systems.

Experiments have shown that moldings with a green product cold compression strength of 50 to 60 N/mm$^2$ can be prepared from a mass that contains 85 wt. % coarse ceramic MgO matrix material of the >1.0 μm and <3 mm particle fraction as well as 15 wt. % of a previously dispersed, finely divided MgO micropowder with a particle size of 0.9 μm; the above-mentioned cold compression strength is several times higher than the cold compression strength values known from the state of the art.

At the same time, densities above 3.15 g/cm$^3$ are reached (these values apply to both the green products and the fired bodies).

Another essential advantage is the fact that the moldings prepared from the mass described here are not subject to any appreciable shrinkage during firing.

I claim:

1. Method of preparing ceramic refractory masses or moldings of high green strength and high density after firing by
   adding a finely divided, refractory, oxidic micropowder,
   which was obtained after dispersion in a non-aqueous dispersing agent, the micropowder comprising micropowder particles having a particle size of less than 10 μm and having a very extensively uniform particle size with 90 wt. % of the micropowder particles having a maximum deviation of +/−10% from the mean diameter of the micropowder particles,
   to a refractory, coarse ceramic matrix material having a particle size greater than the micropowder particles to form a mixture, and
   forming the mixture into ceramic refractory masses or moldings of high green strength and high density after firing.

2. Method in accordance with claim 1, characterized in that the micropowder has a particle size of less than 1 μm.

3. Method in accordance with claim 1, characterized in that the coarse ceramic matrix material occurs in a particle fraction of <5 mm.

4. Method in accordance with claim 1, characterized in that the finely divided micropowder has been prepared in a dispersing medium based on naphthene-basic oil or fatty alcohol.

5. Method in accordance with claim 1, characterized in that a micropowder based on MgO, Al$_2$O$_3$, Cr$_2$O$_3$, and/or TiO$_2$ is used.

6. Method in accordance with claim 5, characterized in that a spinel-forming oxide mixture is used as the micropowder.

7. Method in accordance with claim 1, characterized in that MgO, Al$_2$O$_3$, and/or Cr$_2$O$_3$ is used as the refractory, coarse ceramic matrix material.

8. Method in accordance with claim 7, characterized in that an oxide that forms a spinel with the micropowder is used as the refractory, coarse ceramic matrix material.

9. Method in accordance with claim 1, characterized in that a micropowder dispersion with a solids content exceeding 85 wt. % is used.

10. Method in accordance with claim 9, characterized in that a micropowder dispersion with a solids content exceeding 90 wt. % is used.

11. Method in accordance with claim 1, characterized in that the micropowder dispersion is subjected to a treatment for removing the dispersing medium before it is added to the coarse ceramic matrix material.

12. Method in accordance with claim 11, characterized in that the micropowder dispersion is subjected to spray drying or freeze drying before it is added to the coarse ceramic matrix material.

13. Method of preparing ceramic refractory masses or moldings of high green strength and high density after firing by
    adding a finely divided, refractory, oxidic micropowder, which was obtained after dispersion in a non-aqueous dispersing agent, the micropowder comprising micropowder particles having a particle size of less than 10 μm and having a very extensively uniform particle size with 90 wt. % of the micropowder particles having a maximum deviation of +/−10% from the mean diameter of the micropowder particles, to a refractory, course ceramic matrix material having a particle size greater than the micropowder particles to form a mixture, and forming the mixture into ceramic refractory masses or moldings of high green strength and high density after firing, characterized in that the percentage of the micropowder in the total mixture is 5 wt. % to 18 wt. %.

14. Method in accordance with claim 13, characterized in that the percentage of the micropowder in the total mixture is 10 wt. % to 15 wt. %.

15. Method of preparing ceramic refractory masses or moldings of high green strength and high density after firing by adding a finely divided, refractory, oxidic micropowder, which was obtained after dispersion in a non-aqueous dispersing agent, the micropowder comprising micropowder particles having a particle size of less than 10 μm and having a very extensively uniform particle size with 90 wt. % of the micropowder particles having a maximum deviation of +/−10% from the mean diameter of the micropowder particles, to a refractory, coarse ceramic matrix material having a particle size greater than the micropowder particles to form a mixture, and forming the mixture into ceramic refractory masses or moldings of high green strength and high density after firing, characterized in that the mixture of the micropowder and coarse ceramic matrix material is free of binder.

16. Method of preparing ceramic refractory masses or moldings having high green strength and high density after firing, comprising the steps of preparing a refractory oxidic micropowder comprising micropowder particles having a particle size less than 10 μm, the particle size of the micropowder particles being substantially uniform such that 90 wt. % of the micropowder particles have a maximum deviation of +/−10% from the mean diameter of the micropowder particles, the micropowder being obtained after dispersion in a non-aqueous dispersing medium, and adding the micropowder to a refractory, coarse ceramic matrix material having a particle size greater than the maximum particle size of the micropowder particles to form a mixture, and forming the mixture into ceramic refractory masses or moldings of high green strength and high density after firing, the percentage of the micropowder in the total mixture being 5 wt. % to 18 wt. %, and the mixture of the micropowder and coarse ceramic matrix material being free of binder.

* * * * *